United States Patent [19]

Fusiak

[11] Patent Number: 5,254,282

[45] Date of Patent: * Oct. 19, 1993

[54] ACIDIFIED NMP COMPOSITIONS STABILIZED WITH RESPECT TO COLOR FORMATION THEREIN

[75] Inventor: Frank Fusiak, Bayonne, N.J.

[73] Assignee: Verona Inc., Greenville, S.C.

[ * ] Notice: The portion of the term of this patent subsequent to Sep. 17, 2008 has been disclaimed.

[21] Appl. No.: 860,968

[22] Filed: Mar. 31, 1992

[51] Int. Cl.$^5$ .................... C11D 7/32; C11D 7/50; C09D 9/00
[52] U.S. Cl. .................... 252/143; 134/38; 252/153; 252/162; 252/170; 252/171; 252/542; 252/546; 252/DIG. 8; 252/DIG. 11
[58] Field of Search ............ 252/143, 153, 162, 170, 252/171, 542, 546, DIG. 8, DIG. 11; 134/38

[56] References Cited

U.S. PATENT DOCUMENTS

| | | | |
|---|---|---|---|
| 2,723,222 | 11/1955 | Stark | 252/DIG. 11 |
| 3,963,418 | 6/1976 | Tullio | 8/527 |
| 4,530,781 | 7/1985 | Gipp | 252/546 |
| 4,749,510 | 6/1988 | Nelson | 252/166 |
| 4,812,255 | 3/1989 | Suwala | 252/162 |
| 5,015,410 | 5/1991 | Sullivan | 252/166 |
| 5,049,300 | 9/1991 | Fusiak et al. | 252/162 |

OTHER PUBLICATIONS

"Sequestrene", Alrose Chemical Co. Manufacturers Literature 1952.
Pfizer *Data Sheet No.* 605 "Pfizer Aminocarboxylic Chelating Agents", Apr. 1963.

*Primary Examiner*—Linda Skaling
*Attorney, Agent, or Firm*—Walter Katz; Marilyn J. Maue; Joshua J. Ward

[57] ABSTRACT

Acidified NMP is stabilized against color formation by including a chelating agent in the composition.

3 Claims, No Drawings

ACIDIFIED NMP COMPOSITIONS STABILIZED WITH RESPECT TO COLOR FORMATION THEREIN

BACKGROUND OF THE INVENTION

1. Field of the Invention

This invention relates to paint remover formulations, and, more particularly to acidified N-methyl-2-pyrrolidone (NMP) compositions which are stabilized with respect to color formation therein.

2. Description of the Prior Art

Acidified NMP formulations are effective paint strippers; see U.S. Pat. Nos. 4,749,510; 4,812,255; and 5,049,300. However, these compositions do not exhibit long-term color stability. Usually such acidic compositions turn yellow to dark brown after a period of time. Accordingly, it is an object of this invention to stabilize acidified NMP formulations with respect to color formation therein; and, more particularly, to improve the long-term color stability of acidified NMP solutions.

SUMMARY OF THE INVENTION

What is provided herein is a composition for stabilizing acidified NMP formulations to decrease undesired color formation therein. The invention is characterized by the presence in the composition of a chelating agent, suitably in an amount of at least about 10 ppm, preferably about 50 to 1000 ppm. A preferred chelating agent is ethylenediaminetetraacetic acid (EDTA), and its salts, particularly the sodium and potassium salts.

DETAILED DESCRIPTION OF THE INVENTION

In accordance with the present invention, there is provided a method of stabilizing acidified NMP against undesired color formation by including a chelating agent therein, suitably in an amount of at least about 10 ppm, preferably 50 to 1000 ppm. Suitable chelating agents are selected among aminocarboxylic acids, for example, ethylenediaminetetraacetic acid, hydroxyethylethylenediaminetriacetic acid, and their salts, such as the sodium and potassium salts, and mixtures thereof.

The acidified NMP formulation is prepared as described by Fusiak in U.S. Pat. No. 5,049,300, generally by including an inorganic or organic acid having a $pKa \leq 4.0$, preferably formic acid, sulfuric acid or phosphoric acid, usually in an amount of about 1–25% by weight of the composition, preferably about 5–10%. Alternatively, NMP may be acidified by treatment with a strong acid ion-exchange resin, or by treatment with carbon dioxide or other acidic gases.

Other conventional additives for such NMP paint stripper compositions may be included herein, as described in the above mentioned patent, e.g. diluents, activators, surfactants, thickeners, flavoring agents and bittering agents.

A typical composition of the invention comprises NMP, 7% by weight formic acid and 50 ppm EDTA. Such formulation has an APHA-color rating of 12.9, which increases to only 36.9 after 48 hours at 60° C. The same formulation, without the EDTA stabilizer, also has an initial color rating of 12.9; however, it increases to 144.6 after a similar test period.

The chelators used herein may be included in the acidified NMP compositions as dry powders or as an aqueous solution, e.g. those available as Versene® or Versenol® (Dow Chemical).

The stabilized compositions of the invention have the added advantage during use as paint strippers of decreasing the degree of "black spot" formation on wood substrates that may result when paint is removed. Such black spots are believed to arise from the presence of metals or metallic ions in the coating or from iron leached from stripping tools. Such metallic ions are chelated by the EDTA stabilizer component in the composition herein and black spots do not appear on the treated wood.

EXAMPLE 1

To approximately 100 g. N-methyl-2-pyrrolidone (NMP), 7 g. formic acid (95%) were added and thoroughly mixed until homogeneous. The sample was divided into 50 ml aliquots. To one aliquot, 50 ppm of ethylenediamine-tetraacetic acid (EDTA) was added and thoroughly mixed until homogeneous. The color (APHA) of the samples was measured initially and after 48 hours at 60° C. using a Hunter Colorimeter Model D25P9. Results are listed below:

| Sample | Color Index | |
|---|---|---|
| | Initial | After |
| as is (no EDTA) | 12.9 | 144.6 |
| with 50 ppm EDTA | 12.9 | 36.9 |

EXAMPLE 2

To 750 g. NMP, 0.9 g. Amberlyst® 15 ion exchange resin (strong acid, para-toluene sulfonic acid type resin manufactured by Rohm and Haas) were added and stirred for 3 hours at 80° C. After 3 hours, the NMP was flashed distilled using a one-plate distillation set-up at 100 mm Hg. To 100 g. of the distillate, 100 ppm of EDTA were added and thoroughly mixed until homogeneous. The color (APHA) of the samples was measured initially and after 48 hours at 60° C. using a Hunter Colorimeter Model D25P9. Results are listed below:

| Sample | Color Index | |
|---|---|---|
| | Initial | After |
| as is (no EDTA) | 9.0 | 180.9 |
| with 100 ppm EDTA | 9.0 | 34.8 |

EXAMPLE 3

Carbon dioxide was bubbled through NMP at 450 cc/min to remove residual methylamine for 24 hours. To 100 g. $CO_2$ treated NMP, 885 ppm Versenol® 120 (38% trisodium hydroxyethylethylenediaminetriacetic acid aqueous solution sold by Dow Chemical U.S.A.) were added and thoroughly mixed until homogeneous. The color (APHA) of the samples was measured initially and after 48 hours at 70° C. using a Hunter Colorimeter Model D25P9. Results are listed below:

| Sample | Color Index | |
|---|---|---|
| | Initial | After |
| as is (no EDTA) | 6.4 | 74.4 |
| with 885 ppm Versenol® 120 | 6.5 | 30.9 |

EXAMPLE 4

A paint stripping composition identical to U.S. Pat. No. 5,049,300 was prepared. To 100 g. of the paint stripper, 2000 ppm Versenol® 120 were added and thoroughly mixed until homogeneous. Three grams of untreated and EDTA treated paint stripper were placed onto a freshly sanded red oak panel. A section of steel wool was placed on each sample. A 22 oz. weight was placed upon the steel wool to insure complete contact. After 1 hour at ambient conditions, the steel wool was removed, and the red oak panel evaluated for black spot formation.

| Sample | % Black Spot Formation |
|---|---|
| as is (no chelator) | >95 |
| with 2000 ppm Versenol® 120 | <5 |

While the invention has been described with particular reference to certain embodiments thereof, it will be understood that changes and modifications may be made which are within the skill of the art. Accordingly, it is intended to be bound only by the following claims.

What is claimed is:

1. A paint remover composition which is stabilized against significant long-term color formation therein consisting essentially of a mixture of about 75-99% by weight N-methyl-2-pyrrolidone, and about 1-25% by weight of an inorganic or organic acid having a $pKa \geq 4.0$, and about 10-1000 ppm of a chelating agent selected from the group consisting of ethylenediaminetetraacetic acid, hydroxyethylethylenediaminetriacetic acid, their sodium or potassium salts, and mixtures thereof.

2. A paint remover composition according to claim 1 wherein said acid is formic acid, sulfuric acid or phosphoric acid.

3. A paint remover composition which is stabilized against significant long term color formation therein consisting essentially of a mixture of 90-95% by weight of N-methyl-2-pyrrolidone, 5-10% by weight of formic acid and 50-1000 ppm of a chelating agent selected from ethylenediaminetetraacetic acid, hydroxyethylethylenediamine triacetic acid, and their sodium or potassium salts and mixtures thereof.

* * * * *